(12) United States Patent
Chang et al.

(10) Patent No.: US 9,299,999 B2
(45) Date of Patent: Mar. 29, 2016

(54) THREE ELECTRODE TYPE OF MICROBIAL FUEL CELL AND A METHOD FOR OPERATING THE SAME

(75) Inventors: In-Seop Chang, Gwangju (KR); Junyeong An, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 1171 days.

(21) Appl. No.: 13/320,378

(22) PCT Filed: Jun. 8, 2010

(86) PCT No.: PCT/KR2010/003663
§ 371 (c)(1),
(2), (4) Date: Nov. 14, 2011

(87) PCT Pub. No.: WO2010/143865
PCT Pub. Date: Dec. 16, 2010

(65) Prior Publication Data
US 2012/0064416 A1    Mar. 15, 2012

(30) Foreign Application Priority Data

Jun. 12, 2009 (KR) .................. 10-2009-0052519

(51) Int. Cl.
*H01M 8/16* (2006.01)
*H01M 8/04* (2006.01)

(52) U.S. Cl.
CPC ............... *H01M 8/16* (2013.01); *Y02E 60/527* (2013.01)

(58) Field of Classification Search
CPC ............... H01M 8/16; H01M 8/0271; H01M 8/0289–8/0295; H01M 8/1023; H01M 8/1039; Y02E 60/527

USPC .................................... 429/401, 428
See application file for complete search history.

(56) References Cited

U.S. PATENT DOCUMENTS 3,306,774 A * 2/1967 Dengler ........................ 429/499
6,913,854 B1 * 7/2005 Alberte et al. ................ 429/119
(Continued)

FOREIGN PATENT DOCUMENTS

| JP | 2008-060067 A | * | 3/2008 | .............. H01M 8/16 |
| KR | 2010137766 A | * | 12/2010 | |
| WO | WO 2007/006107 A2 | * | 1/2007 | |
| WO | WO 2008/036347 A2 | * | 3/2008 | .............. H01M 8/16 |

OTHER PUBLICATIONS

International Search Report from PCT/KR2009/002130 dated Dec. 17, 2009.*

(Continued)

*Primary Examiner* — Patrick Ryan
*Assistant Examiner* — Claire L Roe
(74) *Attorney, Agent, or Firm* — Nath, Goldberg & Meyer; Joshua B. Goldberg (57) ABSTRACT

Provided are a three electrode type microbial fuel cell and a method of operating the same. The fuel cell includes a sediment electrode acting as an anode and placed in sediment on the bottom of a contaminated water zone, an intermediate electrode acting as an anode or a cathode and placed in water, and an floating electrode acting as a cathode and placed adjacent to a water surface. In the three electrode type microbial fuel cell, the intermediate electrode may be used as an anode or a cathode according to the concentration of organic contaminants in water of the contaminated water zone, so that the fuel cell can continue to generate electricity in any case where the organic contaminants are present in or removed from the water.

12 Claims, 9 Drawing Sheets

(56) References Cited

U.S. PATENT DOCUMENTS

| | | | |
|---|---|---|---|
| 7,550,224 B1* | 6/2009 | Tender et al. | 429/50 |
| 2006/0118485 A1* | 6/2006 | Gallagher et al. | 210/609 |
| 2006/0281158 A1* | 12/2006 | Felder et al. | 435/168 |
| 2007/0259216 A1* | 11/2007 | Logan | 429/2 |
| 2007/0259217 A1* | 11/2007 | Logan | 429/2 |
| 2008/0090736 A1* | 4/2008 | Zhao et al. | 506/8 |
| 2010/0119879 A1* | 5/2010 | Girguis et al. | 429/2 |
| 2011/0033757 A1* | 2/2011 | Chang et al. | 429/401 |
| 2011/0045513 A1* | 2/2011 | Takenaka et al. | 435/14 |
| 2011/0236769 A1* | 9/2011 | Xie et al. | 429/401 |

OTHER PUBLICATIONS

International Search Report from PCT/KR2010/003663 dated Jan. 4, 2011.*
JP 2008-060067 abstract and machine translation in English.*
Togo, Makoto et al. ("An enzyme-based microfluidic biofuel cell using vitamin K3-mediated glucose oxidation," Electrochimica Acta, 2007, vol. 52, pp. 4669-4674).*
Machine Translation and Abstract in English of KR 2010137766.*

* cited by examiner

THREE ELECTRODE TYPE OF MICROBIAL FUEL CELL AND A METHOD FOR OPERATING THE SAME

TECHNICAL FIELD

The present invention relates to fuel cells, and more particularly, to microbial fuel cells.

BACKGROUND ART

Microbial fuel cells (MFCs) refer to devices which convert chemical energy of substrates acting as electron donors into electric energy using a bacterial catalyst.

Oxygen aeration and treatment of excess sludge comprise the majority of costs associated with treatment of contaminated water such as sewage or waste water. An oxygen aeration apparatus requires increased energy consumption according to an object to be treated, and treatment of contaminated water through oxygen aeration results in generation of large amounts of excess sludge which consists of aerotropic bacteria, causing a cost increase in treatment of excess sludge. To solve such problems, various studies have been conducted with regard to use of microbial fuel cells in treatment of contaminated water.

However, current microbial fuel cells can be used only for experiments and many problems must be overcome for application of microbial fuel cells to treatment of contaminated water.

DISCLOSURE

Technical Problem

The present invention provides a microbial fuel cell and a method of operating the same, which can effectively remove organic contaminants from a contaminated water zone and enable continuous generation of electricity under less influence by water conditions.

The present invention is not limited to the above features, and other features of the present invention may be clearly understood by a person having ordinary knowledge in the art from the following description.

Technical Solution

An aspect of the present invention provides a three electrode type microbial fuel cell. The fuel cell includes: a sediment electrode acting as an anode and placed in sediment on the bottom of a contaminated water zone; an intermediate electrode placed in water and acting as an anode or a cathode; and an floating electrode acting as a cathode and placed adjacent to a water surface.

The fuel cell may further include an electric device having opposite terminals electrically connected to the sediment electrode and the floating electrode, respectively. The intermediate electrode may be connected to one of the opposite terminals of the electric device.

The sediment electrode may be physically connected to the intermediate electrode by a first connecting member. Further, the intermediate electrode may be physically connected to the floating electrode by a second connecting member.

A floating floating member may be connected to the floating electrode. In addition, an intermediate floating member may be connected to the intermediate electrode.

The floating electrode may be coated with metal nanoparticles, and the metal nanoparticles may include anti-bacterial metal nanoparticles.

The anti-bacterial metal nanoparticles may include at least one type of nanoparticles selected from the group consisting of silver, platinum, cobalt, nickel, copper, zinc, and combinations thereof. The anti-bacterial metal nanoparticles are preferably silver nanoparticles.

Another aspect of the present invention provides a method of operating a three electrode type microbial fuel cell. The method includes placing a three electrode type microbial fuel cell in a contaminated water zone, the microbial fuel cell including a sediment electrode acting as an anode, an intermediate electrode and an floating electrode acting as a cathode, such that the sediment electrode is placed in sediment on the bottom of the contaminated water zone, the intermediate electrode is placed in water, and the floating electrode is placed adjacent to a water surface. Then, electricity is generated using the intermediate electrode as an anode or a cathode while removing organic contaminants from the water and the sediment.

Generation of electricity may include generating electricity using the intermediate electrode as an anode to remove organic contaminants from the water and sediment, and generating electricity using the intermediate electrode as a cathode to remove organic contaminants from the sediment.

Advantageous Effects

According to embodiments of the invention, the three electrode type microbial fuel cell includes a sediment electrode acting as an anode and placed in sediment on the bottom of a contaminated water zone; an intermediate electrode placed in water and acting as an anode or a cathode; and an floating electrode acting as a cathode and placed adjacent to a water surface, in which the intermediate electrode may be used as an anode or a cathode according to the concentration of organic contaminants in water of the contaminated water zone, so that the fuel cell may continue to generate electricity in any case where the organic contaminants are present in or removed from the water. Further, the floating electrode coated with metal nanoparticles may promote reduction of oxygen on the floating electrode. In particular, the floating electrode coated with anti-bacterial metal nanoparticles may increase the concentration of oxygen through suppression of growth of bacteria near the floating electrode while promoting reduction of oxygen on the floating electrode, thereby improving performance of the fuel cell.

BEST MODE

Exemplary embodiments of the present invention will now be described in detail with reference to the accompanying drawings. It should be understood that the present invention may be realized in various ways without being limited to the following embodiments.

Figure 1:
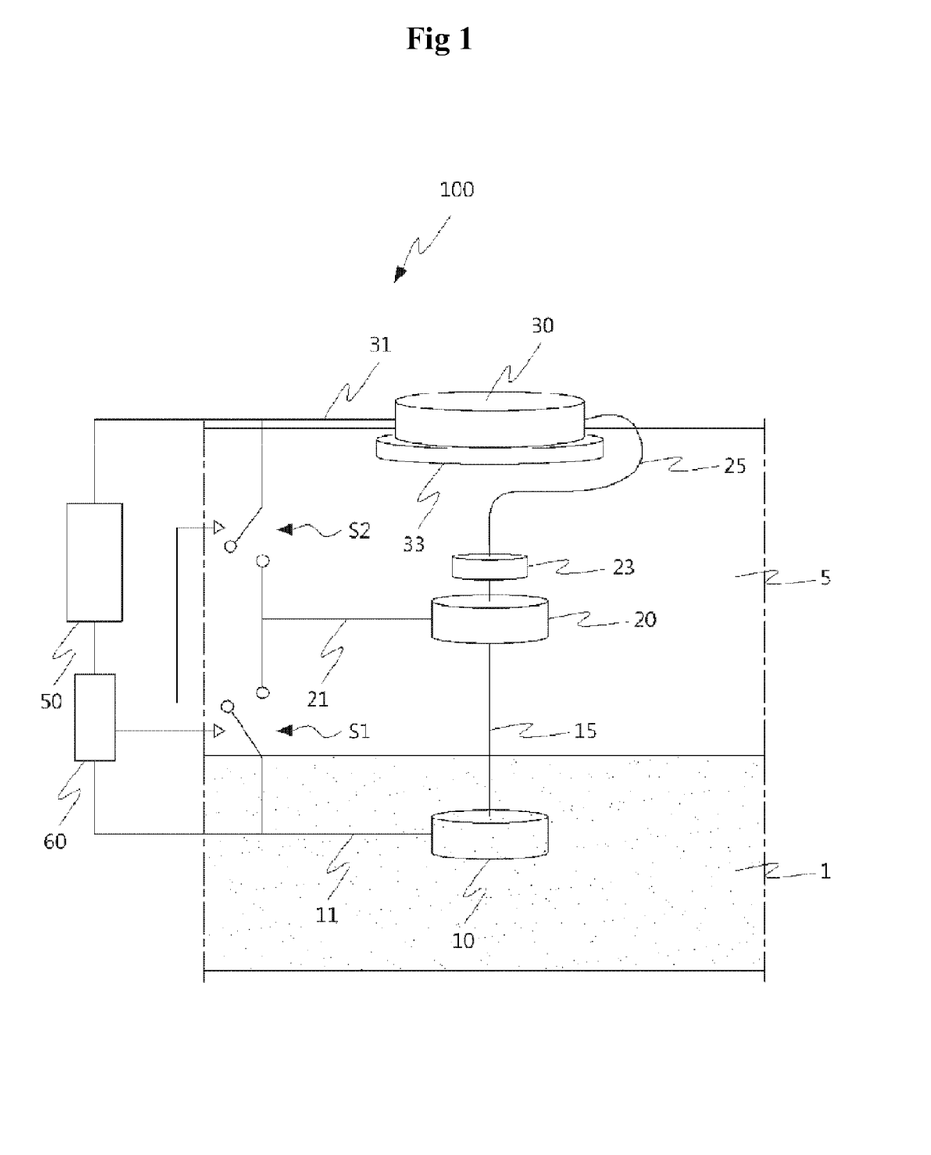
FIG. 1 is a diagram of a three electrode type microbial fuel cell according to one exemplary embodiment of the present invention.

FIG. 1 is a diagram of a three electrode type microbial fuel cell according to one exemplary embodiment of the present invention.

Referring to FIG. 1, a floating type microbial fuel cell 100 includes a sediment electrode 10, an intermediate electrode 20, and an floating electrode 30.

The sediment electrode 10 may be placed in sediment 1 on the bottom of a contaminated water zone 5, the intermediate electrode 20 may be placed in water of the contaminated water zone 5, and the floating electrode 30 may be placed adjacent to a water surface of the contaminated water zone 5. In some cases, the floating electrode 30 may have a larger surface area than the sediment electrode 10 or the intermediate electrode 20.

The sediment electrode 10 and the floating electrode 30 may act as an anode and a cathode, respectively, and the intermediate electrode 20 may act as an anode or a cathode according to environmental conditions. The sediment electrode 10, the intermediate electrode 20, and the floating electrode 30 may be independent carbon electrodes or metal-coated carbon electrodes. The carbon electrode may be a graphite felt, graphite bar, graphite sheet, or porous carbon sheet. In this embodiment, the electrodes 10, 20, 30 may have a plate shape.

Connecting members 15, 25 may be placed between the electrodes 10, 20, 30 to connect the electrodes 10, 20, 30 to each other. Specifically, a first connecting member 15 may be placed between the sediment electrode 10 and the intermediate electrode 20, and a second connecting member 25 may be placed between the intermediate electrode 20 and the floating electrode 30. These connecting members 15, 25 are insulators, may serve to define maximum separating distances between the electrodes 10, 20, 30, and may be made of a flexible material. Thus, each of the electrodes 10, 20, 30 may freely move within a predetermined range.

An upper float member 33 may be placed on a lower portion or a side surface of the floating electrode 30. As a result, the floating electrode 30 may be placed adjacent the water surface of the contaminated water zone 5 or at least one surface of the floating electrode 30 may be exposed from the water surface of the contaminated water zone 5 while floating in the water of the contaminated water zone. An intermediate floating member 23 may be connected to an upper portion of the intermediate electrode 20. In this case, the intermediate electrode 20 may float in the water of the contaminated water zone 5. The floating members 23, 33 may be made of foamed styrene resin (styrofoam).

The sediment electrode 10 and the floating electrode 30 may be electrically connected to opposite ends of an electric device 50, respectively. In addition, the intermediate electrode 20 may be connected to one of the opposite ends of the electric device 50.

Specifically, each of electric wires 11, 21, 31 is electrically connected at one end thereof to each of the electrodes 10, 20, 30. In more detail, one end of a lower electric wire 11, one end of an intermediate electric wire 21, and one end of an upper electric wire 31 are electrically connected to the sediment electrode 10, the intermediate electrode 20, and the floating electrode 30, respectively. The electric wires 11, 21, 31 may be copper electric wires, for example, tin-coated copper wires. In this case, the copper electric wires may be connected to the electrodes 10, 20, 30 via platinum electric wires, respectively.

The other end of the lower electric wire 11 and the other end of the upper electric wire 31 may be connected to the opposite terminals of the electric device 50, respectively. A first switch S1 may be electrically connected between the other end of the lower electric wire 11 and the other end of the intermediate electric wire 21, and a second switch S2 may be electrically connected between the other end of the intermediate electric wire 21 and the upper electric wire 31.

Examples of the electric device 50 may include a battery, a resistor, or a controller. For example, when the electric device 50 is a battery, a controller 60 may be connected to the battery in series.

The controller 60 may detect the amount of electricity generated by the fuel cell 100, and may turn on one of the switches while turning off the other according to the amount of electricity generated by the fuel cell 100.

Figure 2:
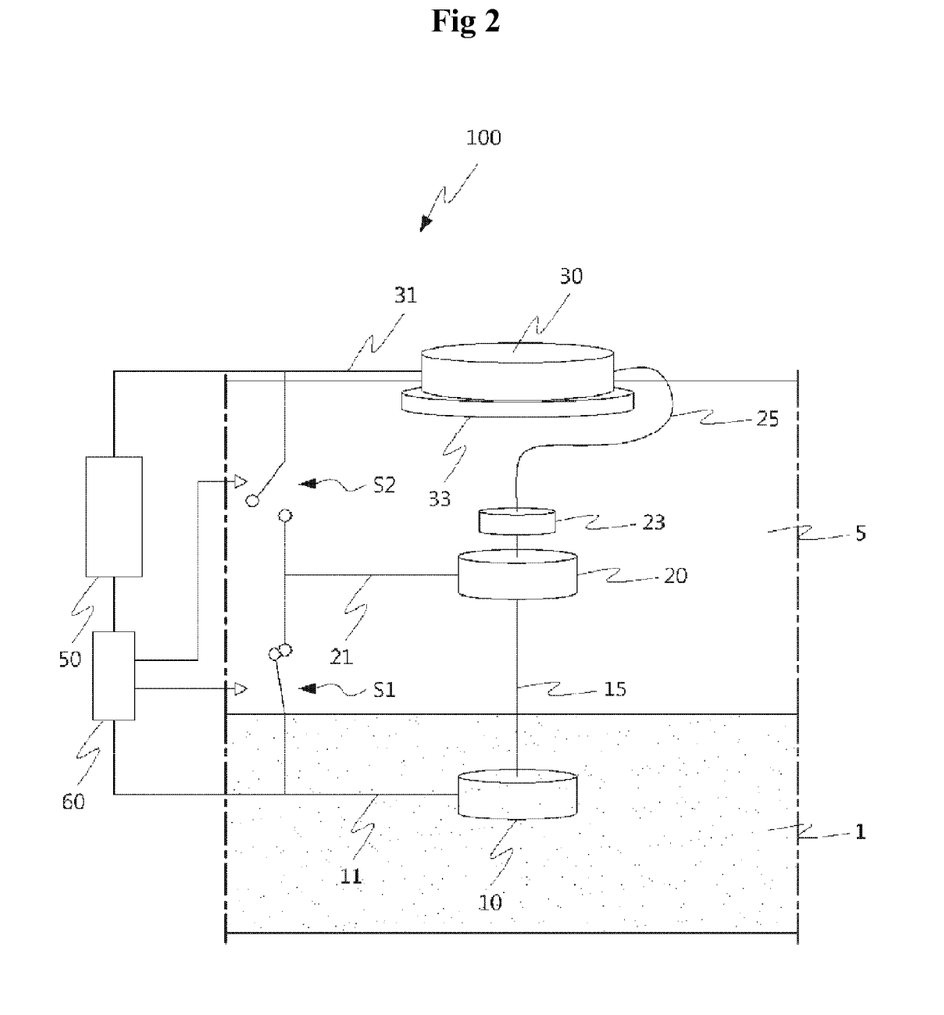
FIG. 2 and FIG. 3 are diagrams explaining a method of operating a microbial fuel cell according to one exemplary embodiment of the present invention.
Figure 3:
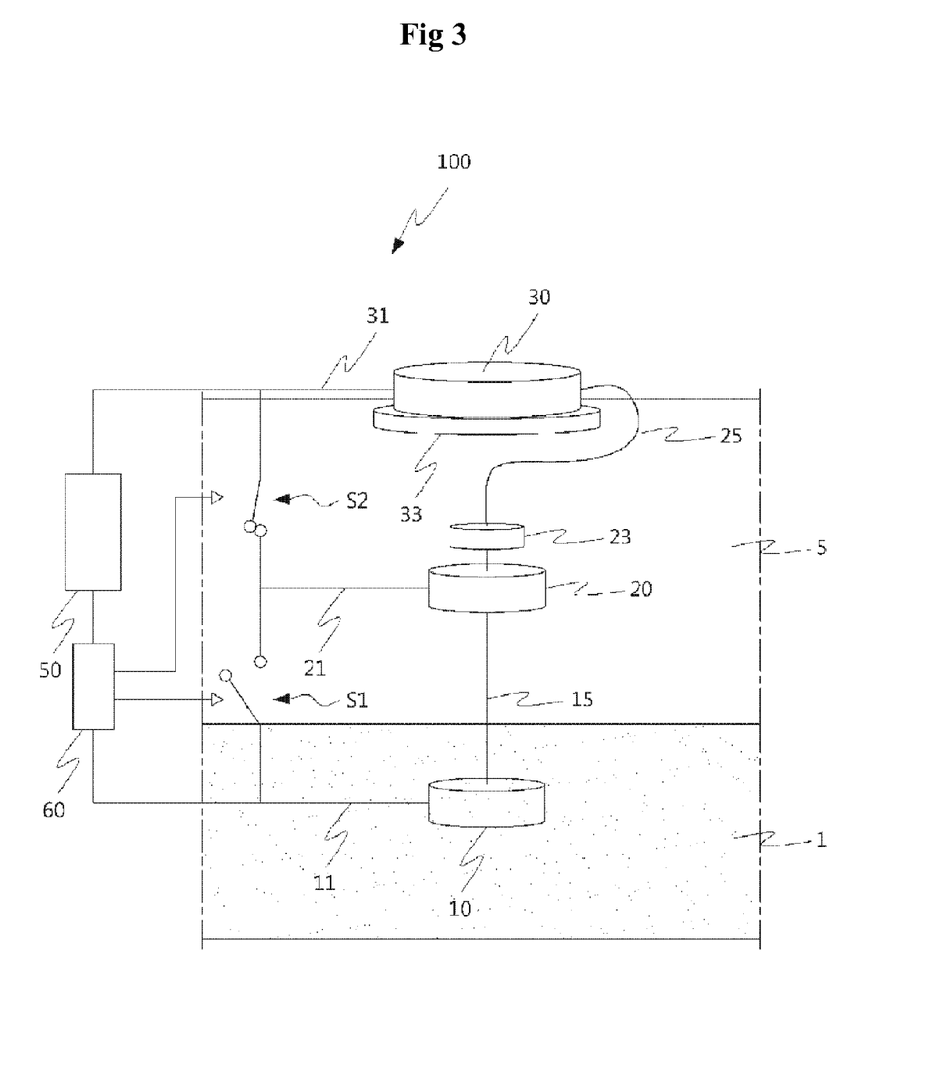

FIG. 2 and FIG. 3 are diagrams explaining a method of operating a microbial fuel cell according to one exemplary embodiment of the present invention.

Referring to FIG. 2, a three electrode type microbial fuel cell 100 including a sediment electrode 10, an intermediate electrode 20 and an floating electrode 30 is installed in a contaminated water zone 5, which is contaminated by organic contaminants. Specifically, the sediment electrode 10 is placed in sediment 1 on the bottom of the contaminated water zone 5, the intermediate electrode 20 is placed in water of the contaminated water zone 5, and the floating electrode 30 is placed adjacent to a water surface of the contaminated water zone 5.

The contaminated water zone 5 may be a closed natural water zone such as a lake or a water hazard of a golf course, or may be an artificial water zone such as sewage or wastewater disposal plants. The contaminated water zone 5 may be contaminated by organic contaminants, such as starch, acetate, lactate, or pyruvate. Further, the sediment 1 may contain a higher concentration of organic contaminants than water of the contaminated water zone 5.

Electrochemically active bacteria (EAB) may be present in the sediment 1 and water of the contaminated water zone. The electrochemically active bacteria may oxidize the organic contaminants acting as a substrate within a cell and directly transfer electrons generated by oxidation of the organic contaminants from the cell to the outside, and the electrons may be transferred to an anode through electron acceptors. Accordingly, there is no need for mediators which are reduced by the electrons transferred from the bacteria cell and pass through a cell membrane to transfer electrons between the bacteria and the anode. When such mediators are used, 100% of the mediators cannot be recovered from the bacteria cell, and operation of the microbial fuel cell requires continuous repletion of mediators, so that the mediators are accumulated in the bacteria cell and toxicity of the accumulated mediators in the cell can stop metabolism of the bacteria. However, according to this embodiment, the electrochemically active bacteria are used, thereby eliminating use of mediators and side effects caused by the mediators.

The electrochemically active bacteria may be metal salt-reducing bacteria. In this case, the metal salt-reducing bacteria may include *Disulfovibrio vulgaris, Geobacter metallireducens, Geobacter sulfurreducens*, or *Shewanella oneidensis*. Such metal salt-reducing bacteria may use

Cr(VI), U(VI), As(V), Fe(III), or Mn(IV) as an electron acceptor. Specifically, *Disulfovibrio vulgaris* may use lactate as a substrate and use Cr(VI), U(VI) or As(V) as an electron acceptor; *Geobacter metallireducens* may use acetate or hydrogen as a substrate and use Fe(III), Mn(IV) or U(VI) as an electron acceptor; *Geobacter sulfurreducens* may use acetate as a substrate and use Fe(III) or Mn(IV) as an electron acceptor; and *Shewanella oneidensis* may use lactate or pyruvate as a substrate and use Fe(III), Mn(IV) or U(VI) as an electron acceptor.

It is reported that such electrochemically active bacteria can be easily found in contaminated water having low concentrations of oxygen in anaerobic ecosystems found in sewage or wastewater disposal plants (Kim et al., *Journal of Applied Microbiology* 99:978-987; Lee et al., 2003, *FEMS Microbiology Letters* 223:18J-191). Particularly, it is also reported that contaminated water of wastewater disposal plants contains a relatively high concentration of iron, and active sludge of the wastewater disposal plant contains iron oxide(III)-reducing bacteria (see Nielsen et. al., 1996, *Water Science and Technology* 34: 129-136).

On the other hand, aerotropic bacteria in the contaminated water zone 5 remove oxygen from the water by consuming the organic contaminants, and thus the amount of dissolved oxygen in the water may be very low. As such, when the amount of dissolved oxygen is very low in the water of the contaminated water zone 5, the first switch S1 may be turned on while the second switch S2 is turned off. In this case, the intermediate electrode 20 may act as an anode together with the sediment electrode 10 and the floating electrode 30 may act as a cathode.

Oxidation of the organic contaminants occurs on the anode, that is, on the intermediate electrode 20 and the sediment electrode 10. Specifically, the electrochemically active bacteria oxidize the substrate, that is, the organic contaminants, and transfer electrons generated by oxidation of the substrate from the cell to an exterior of the cell, and the electrons transferred to the exterior reduce an electron acceptor, which in turn is oxidized on the anode while transferring electrons to the anode. During oxidation of the organic contaminants, hydrogen ions may be generated, and, in some cases, carbon dioxide may also be generated.

Assuming that starch is the organic contaminants, chemical reaction occurring on the anode may be as follows.

[Chemical Reaction 1]

Hydrogen ions generated during oxidation of the organic contaminants are transferred to the cathode, that is, the floating electrode 30. On the other hand, electrons are transferred to the floating electrode 30 through the electric wires, that is, the lower electric wire 11 and the intermediate electric wire 21, whereby electricity may be stored in the electric device 50 constituting a battery.

At this time, gas such as carbon dioxide may escape into the air through the water surface of the contaminated water zone 5.

Reduction of oxygen occurs on the cathode, that is, on the floating electrode 30. Specifically, dissolved oxygen on the water surface of the contaminated water zone 5 may react with hydrogen transferred from the anode, thereby producing water. One example of reaction occurring on the floating electrode 30 is as follows.

[Chemical Reaction 2]

Through oxidation of the organic contaminants and reduction of oxygen as described above, the organic contaminants in the water of the contaminated water zone 5 may be gradually depleted, so that the amount of dissolved oxygen may gradually increase in the water of the contaminated water zone 5. Further, as the organic contaminants in the water are depleted, additional oxidation of the organic materials is unlikely to occur on the intermediate electrode 20. Accordingly, the amount of electricity generated by the microbial fuel cell 100 may decrease.

Referring to FIG. 3, when electric current generated through the fuel cell 100 decreases to a certain value or less, the controller 60 may turn off the first switch S1 while turning on the second switch S2. In this case, the intermediate electrode 20 may act as a cathode together with the floating electrode 30, and the sediment electrode 10 may act as an anode.

On the anode, that is, on the sediment electrode 10, oxidation of the organic contaminants may occur as described above, thereby producing electrons and hydrogen ions. The electrons are transferred to the cathode, that is, the floating electrode 30 and the intermediate electrode 20, through the electric wires, and the hydrogen is transferred to the floating electrode 30 and the intermediate electrode 20 through water. On the cathode, that is, on the intermediate electrode 20 and the floating electrode 30, reduction of oxygen may occur as described above, thereby producing water. In particular, oxygen reduced on the intermediate electrode 20 is oxygen dissolved in water.

During this process, the electrons allow the battery 50 to store electricity and an electric current generated by the fuel cell 100 may increase again.

However, when additional contaminants are further added to the contaminated water zone 5, the amount of dissolved oxygen for reduction on the intermediate electrode 20 may decrease again, and the amount of electricity generated through the microbial fuel cell 100 may decrease again.

In this case, the controller 60 may turn off the second switch S2 while turning on the first switch S1. Accordingly, as described with reference to FIG. 2, the intermediate electrode 20 may act as an anode together with the sediment electrode 10, and the floating electrode 30 may act as a cathode. At this time, oxidation of the organic contaminants occurs on the intermediate electrode 20 and the sediment electrode 10, and reduction of oxygen occurs on the cathode, that is, on the floating electrode 30, so that the amount of electricity generated through the fuel cell 100 may increase again.

As such, the intermediate electrode 20 placed in the water may be used as an anode or a cathode according to the concentration of the organic contaminants in the water of the contaminated water zone, thereby enabling continuous generation of electricity in any case where the organic contaminants are present in or removed from the water.

Figure 4:
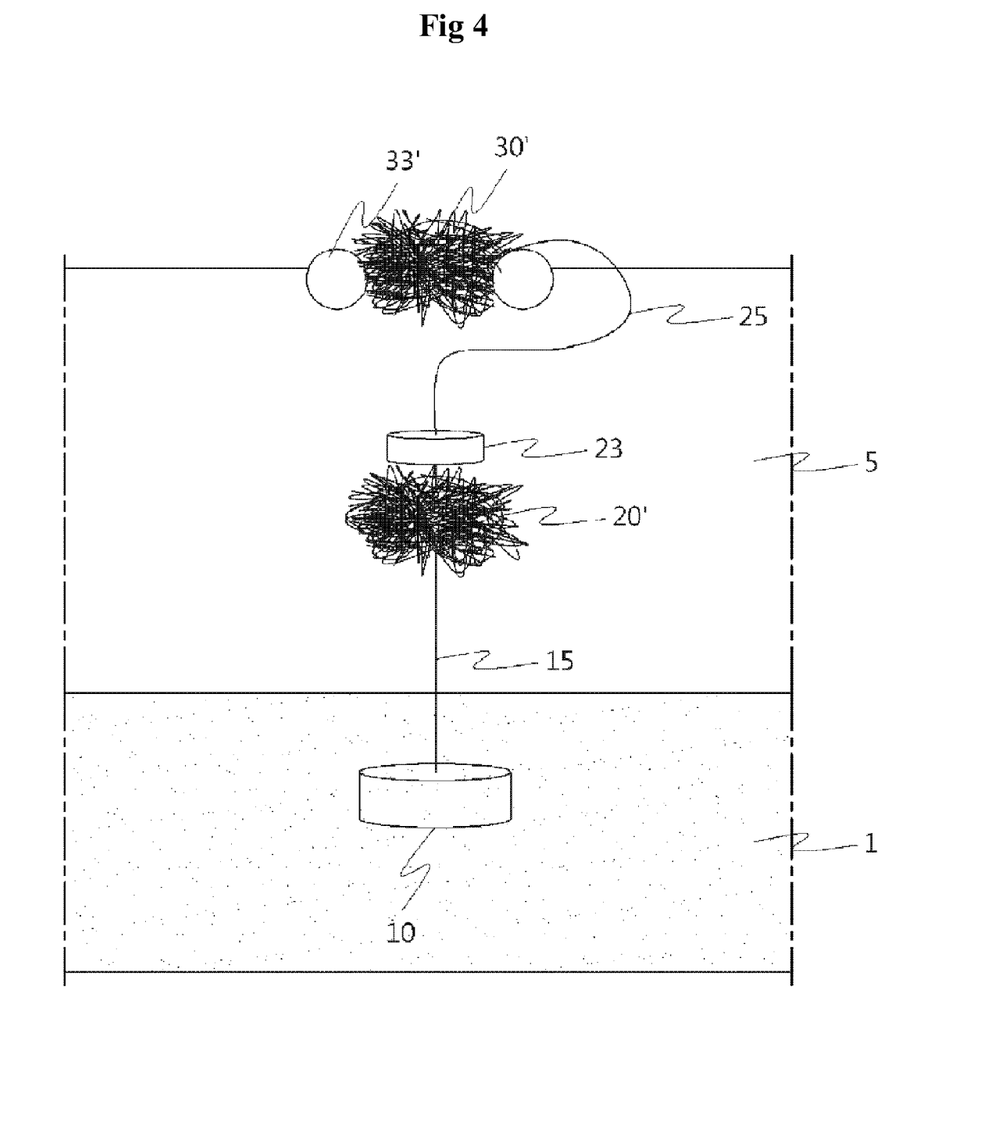
FIG. 4 is a diagram of a three electrode type microbial fuel cell according to another exemplary embodiment of the present invention.

FIG. 4 is a diagram of a three electrode type microbial fuel cell according to another exemplary embodiment of the present invention. The microbial fuel cell according to this embodiment is the same as the microbial fuel cell described with reference to FIG. 1 to FIG. 3, except for the following features Referring to FIG. 4, at least one of the electrodes of the microbial fuel cell may have a radial shape instead of a plate shape. In this embodiment, a sediment electrode 10 has a plate shape, and an intermediate electrode 20' and an floating electrode 30' have radial shapes. The radial electrodes may significantly increase a contact area with respect to organic contaminants or oxygen. Further, upper float members 33' may be placed at opposite sides of the floating electrode 30' to float the floating electrode 30'.

On the other hand, the floating electrode 30 may be coated with metal nanoparticles. When the floating electrode 30 is coated with the metal nanoparticles, it is possible to promote reduction of oxygen which acts as a final electron acceptor in the three electrode type microbial fuel cell (cathode reaction, see Chemical reaction 2), thereby improving fuel cell performance. Thus, any metal nanoparticle may be coated on the floating electrode 30 so long as the metal nanoparticle can be used as a catalyst for reduction of oxygen. For example, the metal nanoparticles may include at least one type of nanoparticles selected from the group consisting of gold (Au), silver (Ag), platinum (Pt), palladium (Pd), copper (Cu), nickel (Ni), iron (Fe), ruthenium (Ru), rhodium (Rh), iridium (Ir), tungsten (W), tin (Sn), bismuth (Bi), cobalt (Co), zinc (Zn), and combinations thereof.

Particularly, when anti-bacterial metal nanoparticles are used as the metal nanoparticles, it is possible to suppress growth of aerotropic bacteria near the floating electrode 30 while guaranteeing a catalytic function of oxygen reduction described above.

In a general fuel cell, oxygen is sufficiently supplied from a cathode, but the three electrode type microbial fuel cell according to this embodiment may be operated under oxygen depleted conditions. In this case, cathode reaction of the floating electrode 30 may act as a reaction limitation step with respect to electricity generation of the microbial fuel cell. At this time, depletion of oxygen acting as a final electron acceptor is caused by an increase of aerotropic bacteria, which results from an increase in the amount of high concentration organic materials near the floating electrode 30, and consumption of oxygen by the increased aerotropic bacteria. Accordingly, when the floating electrode 30 is coated with the anti-bacterial metal nanoparticles to suppress growth of the aerotropic bacteria, depletion of oxygen acting as the final electron acceptor may be prevented, thereby improving performance of the three electrode type microbial fuel cell. The anti-bacterial metal nanoparticles may include at least one type of nanoparticles selected from the group consisting of, for example, silver (Ag), platinum (Pt), cobalt (Co), nickel (Ni), copper (Cu), zinc (Zn), and combinations thereof. Preferably, the anti-bacterial metal nanoparticles are silver nanoparticles.

Next, the present invention will be explained in more detail with reference to the following example and comparative examples. It should be understood that these examples are provided for illustration only and are not to be construed as limiting the present invention.

Figure 5:
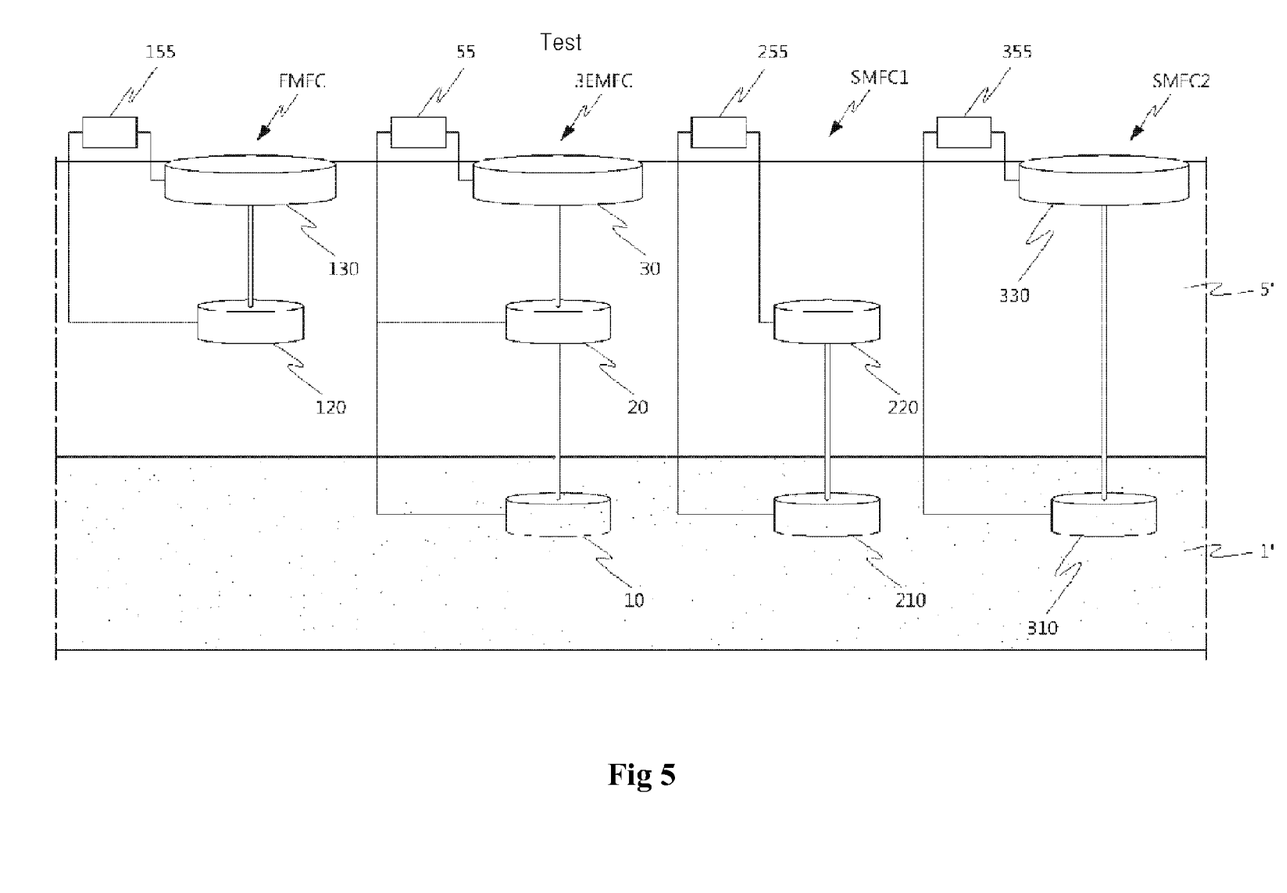
FIG. 5 is a diagram of a test apparatus for a preparation example and Comparative Examples 1 to 3.

FIG. 5 is a diagram explaining a test apparatus for a preparation example and Comparative Examples 1 to 3. Hereinafter, the preparation example and the comparative examples will be described with reference to FIG. 5.

PREPARATION EXAMPLE

With sediment 1' and artificial wastewater 5' placed in a water bath, a three electrode type microbial fuel cell (3EMFC) was installed in a water bath such that a sediment electrode 10 was placed in the sediment 1', an floating electrode 30 was placed in water with an upper surface thereof was disposed adjacent to the water surface, and an intermediate electrode 20 was placed between the sediment electrode 10 and the floating electrode 30. The electrodes were respectively connected to wires such that a wire connected to the sediment electrode 10 and a wire connected to the intermediate electrode 20 were tied and connected to one end of a voltage-current tester 55, and an electric wire connected to the floating electrode 30 was connected to the other end of the voltage-current tester 55.

Comparative Example 1

A floating type microbial fuel cell (FMFC) was installed to the water bath. That is, an anode 120 was placed in water, and a cathode 130 was placed in water with an upper surface thereof disposed adjacent to the water surface. Electric wires were connected to the anode 120 and the cathode 130 and then were connected to opposite ends of a voltage-current tester 155, respectively.

Comparative Example 2

A first sediment microbial fuel cell (SMFC1) was installed to the water bath. That is, an anode 210 was placed in sediment 1' and a cathode 220 was placed in water. Electric wires were connected to the anode 210 and the cathode 220 and then were connected to opposite ends of a voltage-current tester 255, respectively.

Comparative Example 3

A second sediment microbial fuel cell (SMFC2) was installed to the water bath. That is, an anode 310 was placed in sediment 1', and a cathode 330 was placed in water with an upper surface thereof disposed adjacent to the water surface. Electric wires were connected to the anode 310 and the cathode 330 and then were connected to opposite ends of a voltage-current tester 355, respectively.

<Test 1>

While supplying artificial wastewater containing 3 mM acetate at a rate of 1 ml/min to the water bath, the fuel cells were operated for about 25 days. After stopping supply of the artificial wastewater, the fuel cells were left for about 5 days and closed circuit voltage of each fuel cell was measured using a voltage-current tester Multimeter™ (Keithly Instruments, Inc.).

Figure 6:
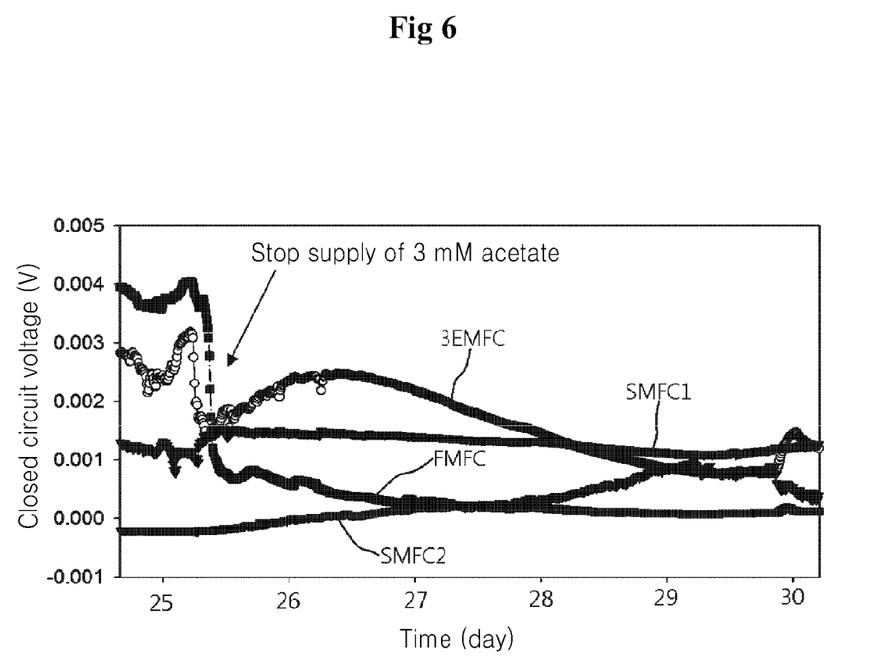
FIG. 6 is a graph of voltage as measured in Test 1.

FIG. 6 is a graph of voltage as measured in Test 1.

Referring to FIG. 6, after stopping supply of the artificial wastewater, the three electrode type microbial fuel cell (3EMFC) according to the example exhibited a higher closed circuit voltage than the floating type microbial fuel cell (FMFC) or the sediment microbial fuel cells (SMFC1, SMFC2). However, the first microbial fuel cell (SMFC1) gradually increased in voltage over time. With regard to this result, it was concluded that organic contaminants in the water were removed by operation of the fuel cell and the amount of dissolved oxygen increased in the water, thereby allowing active reduction of oxygen on the cathode of the first microbial fuel cell (SMFC1). Accordingly, it was anticipated that upon depletion of the organic contaminants, the three electrode type microbial fuel cell would exhibit a higher voltage, since reduction of oxygen would occur on the intermediate electrode by electrically connecting the intermediate electrode 20 (FIG. 5) and the floating electrode 30 (FIG. 5) of the three electrode type microbial fuel cell according to the example to each other to use the intermediate electrode and the floating electrode as a cathode.

<Test 2>

While supplying artificial wastewater containing 1 mM acetate to the water bath at a rate of 1 ml/min, the fuel cells were operated for about 25 days. After stopping supply of the artificial wastewater, the fuel cells were left for about 5 days and the artificial wastewater containing 1 mM acetate was supplied again to the water bath. Then, the fuel cells were left for about 11 days and closed circuit voltage of each fuel cell was measured using a voltage-current Multimeter™ (Keithly Instruments, Inc.).

Figure 7:
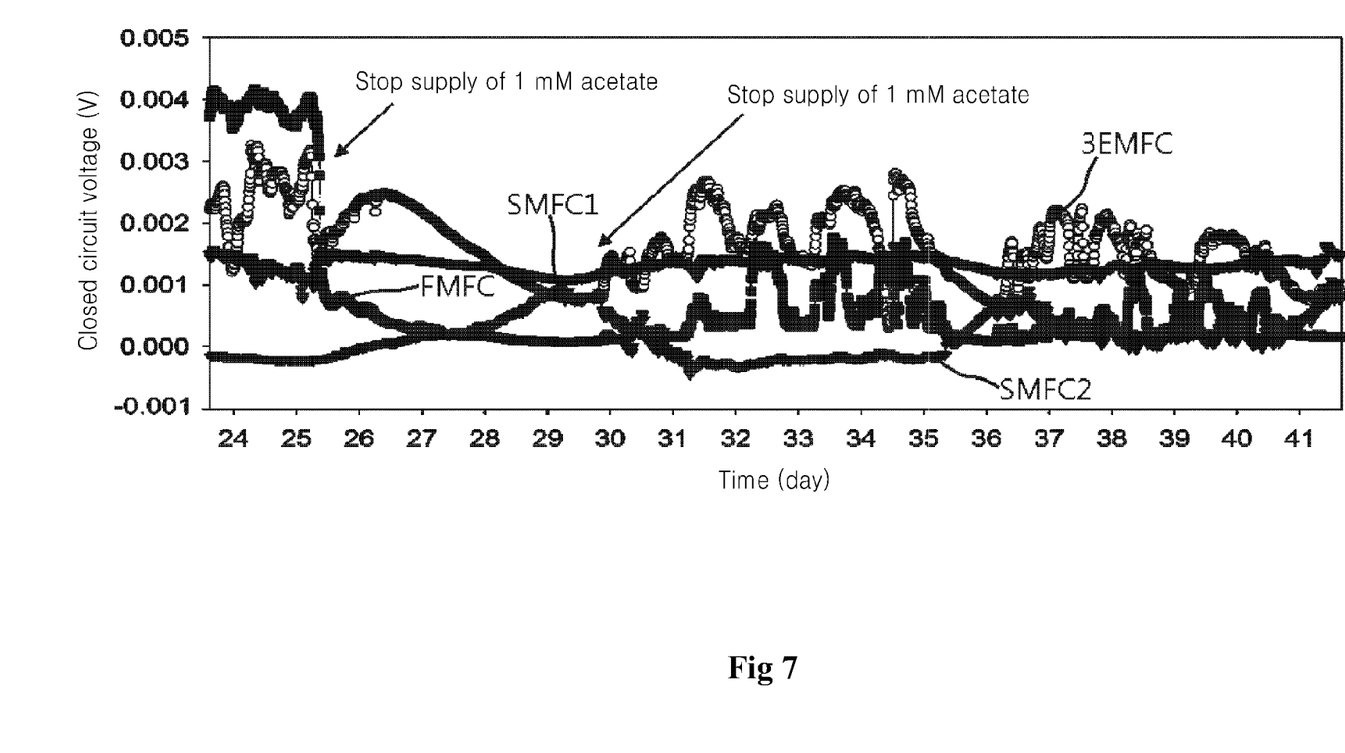
FIG. 7 is a graph of voltage as measured in Test 2.

FIG. 7 is a graph of voltage as measured in Test 2

Referring to FIG. 7, after stopping supply of the artificial wastewater, the fuel cells underwent a phenomenon similar to that described with reference to FIG. 6. On the other hand, after resuming supply of the artificial wastewater, the three electrode type microbial fuel cell (3EMFC) according to the example continued to exhibit a higher closed circuit voltage than the floating type microbial fuel cell (FMFC) or the sediment microbial fuel cells (SMFC1, SMFC2).

<Test 3>

Figure 8:
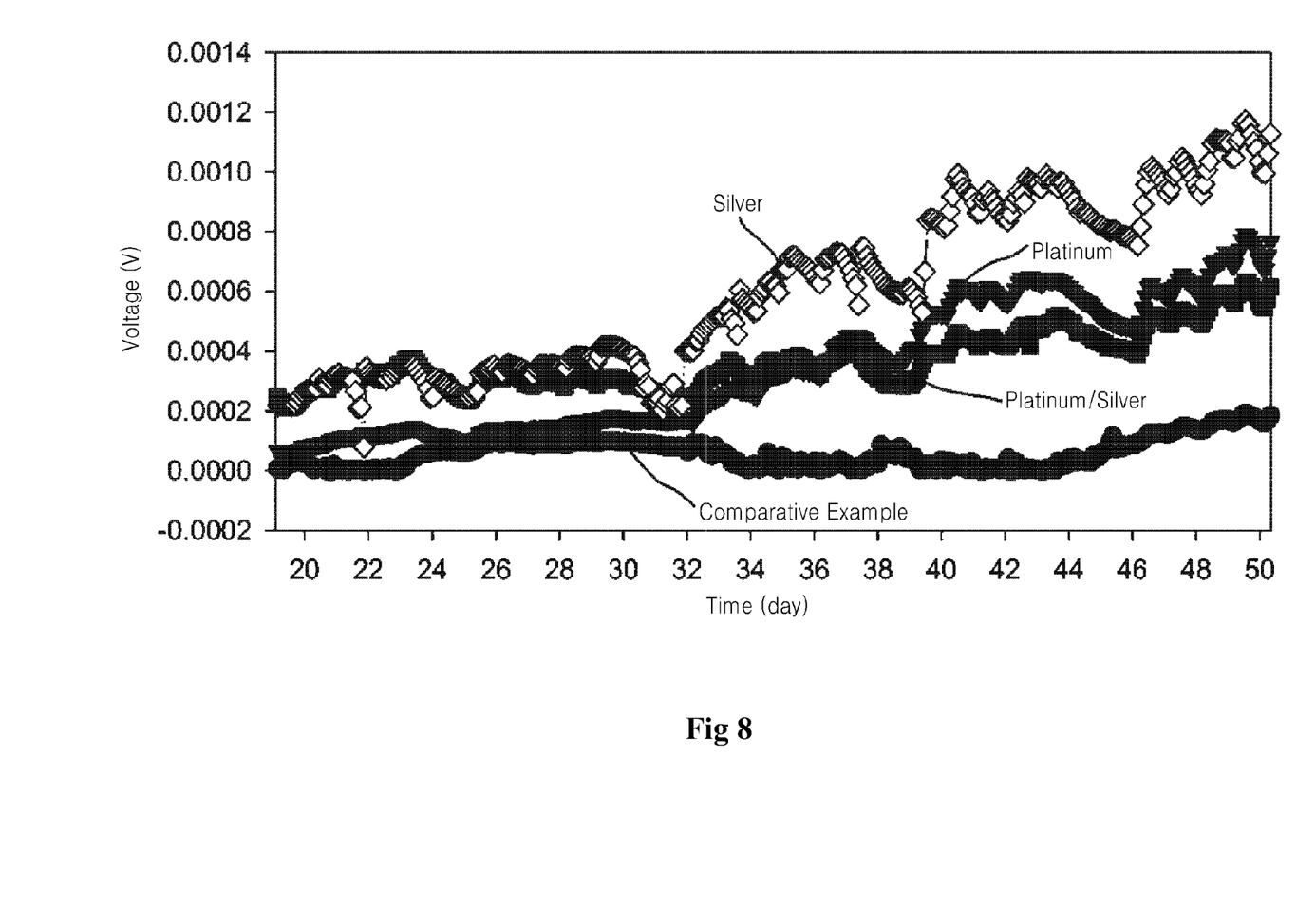
FIG. 8 is a graph of voltage as measured in Test 3.

In order to confirm effects of a metal nanoparticle catalyst introduced into the floating electrode 30 of the three electrode type microbial fuel cell, a three electrode type microbial fuel cell including an floating electrode 30 not coated with metal nanoparticles (Comparative Example) was compared with a three electrode type microbial fuel cell including an floating electrode 30 coated with metal nanoparticles as follows.

First, to prepare a solution of silver nanoparticles, a Nafion solution, isopropanol and silver nanoparticles were mixed in a serum vial, followed by sonication for 30 minutes. Then, the silver nanoparticles were deposited in a total amount of 2 $mg/cm^2$ to opposite sides of a graphite felt electrode.

By the same method, platinum nanoparticles were deposited in an amount of 2 $mg/cm^2$ to opposite sides of a graphite felt electrode, and mixed nanoparticles of silver and platinum nanoparticles were deposited in an amount of 2 $mg/cm^2$ (silver 1 $mg/cm^2$+platinum 1 $mg/cm^2$) to opposite sides of a graphite felt electrode.

Artificial wastewater to be injected into reactors was prepared by mixing water obtained from a reservoir and acetate to have a concentration of 50 mM acetate, followed by sterilization using a sterilizer and supply of nitrogen for removal of oxygen, before injection into the reactors. The reactors were independently operated.

FIG. 8 is a graph of voltage as measured in Test 3.

Figure 9:
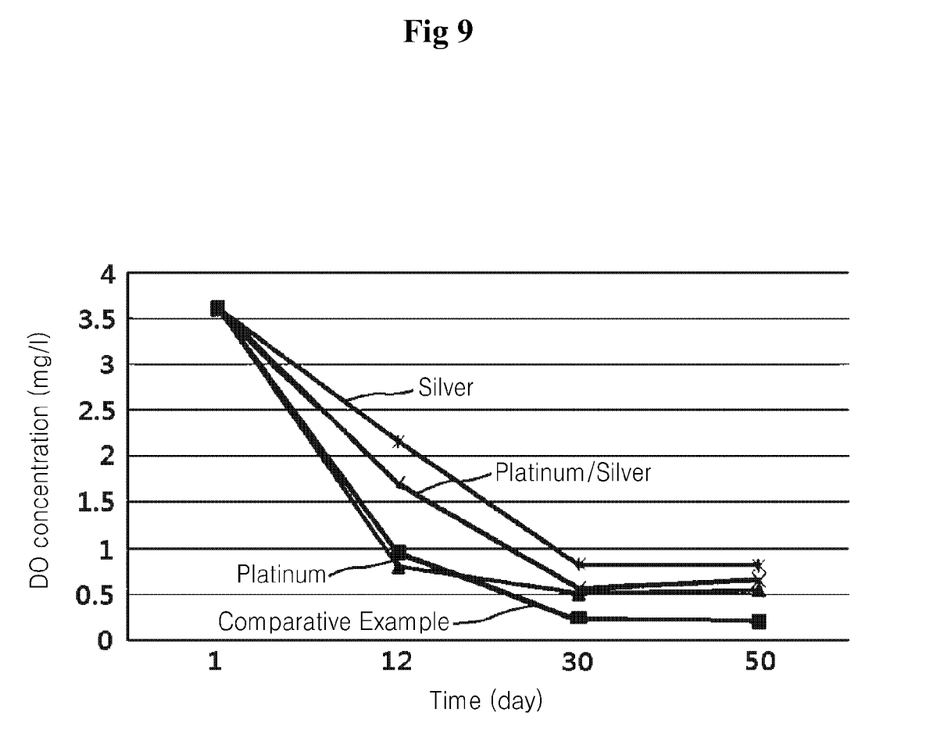
FIG. 9 is a graph of dissolved oxygen concentration as measured in Test 3.

FIG. 9 is a graph of dissolved oxygen (DO) concentration as measured in Test 3

Referring to FIG. 8, it can been seen that the fuel cell having the metal nanoparticles introduced as a catalyst into the floating electrode 30 acting as a cathode exhibited a higher voltage than the fuel cell (Comparative Example), into which no metal nanoparticles were introduced. With regard to this result, it was concluded that the metal nanoparticles suppressed growth of aerotropic bacteria near the floating electrode 30 to increase oxygen concentration while acting as a catalyst for reduction of oxygen.

Particularly, it was confirmed that the fuel cell having the floating electrode 30 coated with the silver nanoparticles provided a higher voltage than the other cases in which the floating electrode was coated with the platinum nanoparticles (or mixed nanoparticles of silver and platinum nanoparticles). With regard to this result, it was concluded that excellent anti-bacterial properties of the silver nanoparticles maintained a relatively high concentration of dissolved oxygen as shown in FIG. 9. Accordingly, it could be seen that, when the floating electrode 30 underwent an increase in aerotropic bacteria by a high concentration of organic materials and depletion of oxygen resulting therefrom during operation of the three electrode type microbial fuel cell, the silver nanoparticle catalyst was more effective than the platinum nanoparticle catalyst in improvement of performance of the three electrode type microbial fuel cell.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the following claims and equivalents thereof.

The invention claimed is:

1. A three electrode microbial fuel cell comprising:
   a sediment electrode acting as an anode and placed in sediment on the bottom of a contaminated water zone;
   an intermediate electrode acting as an anode or a cathode and placed in water; and
   a floating electrode acting as a cathode and placed adjacent to a water surface.

2. The microbial fuel cell of claim 1, further comprising: an electric device having opposite terminals electrically connected to the sediment electrode and the floating electrode, respectively, the intermediate electrode being connected to one of the opposite terminals of the electric device.

3. The microbial fuel cell of claim 2, wherein the electric device comprises a battery.

4. The microbial fuel cell of claim 1, further comprising:
   a first connecting member physically connecting the sediment electrode to the intermediate electrode; and
   a second connecting member physically connecting the intermediate electrode to the floating electrode.

5. The microbial fuel cell of claim 1, further comprising an upper floating member connected to the floating electrode.

6. The microbial fuel cell of claims 1, further comprising an intermediate floating member connected to the intermediate electrode.

7. The microbial fuel cell of claim 1, wherein the floating electrode is coated with metal nanoparticles.

8. The microbial fuel cell of claim 7, wherein the metal nanoparticles comprise anti-bacterial metal nanoparticles.

9. The microbial fuel cell of claim 8, wherein the anti-bacterial metal nanoparticles comprise at least one type of nanoparticles selected from the group consisting of silver, platinum, cobalt, nickel, copper, zinc, and combinations thereof.

10. The microbial fuel cell of claim 8, wherein the anti-bacterial metal nanoparticles comprise silver nanoparticles.

11. A method of operating a three electrode microbial fuel cell, comprising:
    placing a three electrode microbial fuel cell in a contaminated water zone, the microbial fuel cell including a sediment electrode acting as an anode, an intermediate electrode and a floating electrode acting as a cathode, such that the sediment electrode is placed in sediment on the bottom of the contaminated water zone, the intermediate electrode is placed in water, and the floating electrode is placed adjacent to a water surface; and
    generating electricity using the intermediate electrode as an anode or a cathode while removing organic contaminants from the water and the sediment.

12. The method of claim 11, wherein the generating electricity comprises generating electricity using the intermediate electrode as an anode while removing the organic contaminants from the water and the sediment, and generating electricity using the intermediate electrode as a cathode while removing the organic contaminants from the sediment.

* * * * *